(12) United States Patent
Craeghs et al.

(10) Patent No.: US 10,384,263 B2
(45) Date of Patent: Aug. 20, 2019

(54) HYBRID SUPPORT SYSTEMS AND METHODS OF GENERATING A HYBRID SUPPORT SYSTEM USING THREE DIMENSIONAL PRINTING

(71) Applicant: Materialise N.V., Leuven (BE)

(72) Inventors: Tom Craeghs, Leuven (BE); Gerald Eggers, Leuven (BE); Tom Cluckers, Leuven (BE)

(73) Assignee: Materialise N.V., Leuven (BE)

( * ) Notice: Subject to any disclaimer, the term of this patent is extended or adjusted under 35 U.S.C. 154(b) by 853 days.

(21) Appl. No.: 14/921,815

(22) Filed: Oct. 23, 2015

(65) Prior Publication Data
US 2016/0107234 A1 Apr. 21, 2016

Related U.S. Application Data

(63) Continuation of application No. PCT/EP2014/058484, filed on Apr. 25, 2014.

(60) Provisional application No. 61/816,313, filed on Apr. 26, 2013.

(51) Int. Cl.
| | |
|---|---|
| *B22F 3/105* | (2006.01) |
| *B28B 1/00* | (2006.01) |
| *B29C 64/135* | (2017.01) |
| *B29C 64/153* | (2017.01) |
| *B29C 64/40* | (2017.01) |
| *B33Y 10/00* | (2015.01) |

(Continued)

(52) U.S. Cl.
CPC ............ *B22F 3/1055* (2013.01); *B28B 1/001* (2013.01); *B29C 64/135* (2017.08); *B29C 64/153* (2017.08); *B29C 64/40* (2017.08); *B22F 2003/1058* (2013.01); *B29K 2105/251* (2013.01); *B33Y 10/00* (2014.12); *B33Y 30/00* (2014.12)

(58) Field of Classification Search
CPC ...................................................... B22F 3/1055
See application file for complete search history.

(56) References Cited

U.S. PATENT DOCUMENTS

| | | | |
|---|---|---|---|
| 5,595,703 A * | 1/1997 | Swaelens | A61B 17/58 264/401 |
| 5,897,825 A | 4/1999 | Fruth | |
| 2002/0171177 A1 | 11/2002 | Kritchman et al. | |

(Continued)

OTHER PUBLICATIONS

International Search Report from parent international application PCT/EP2014/058484 dated Dec. 11, 2014.

*Primary Examiner* — Christopher S Kessler
(74) *Attorney, Agent, or Firm* — Patterson + Sheridan, LLP

(57) ABSTRACT

This disclosure relates to a hybrid support system for supporting an object formed by three dimensional printing. In some embodiments, a hybrid support system includes one or more volume support structures, a first volume support structure of the one or more volume support structures being coupled to a base plate and to a first portion of the object. The hybrid support system further includes a partially solidified support structure coupled to a second portion of the object. The hybrid support system further includes one or more reinforcement support structures, a first reinforcement support structure of the one or more reinforcement support structures being coupled to the base plate and to at least one of a portion of the partially solidified support structure and a third portion of the object.

11 Claims, 10 Drawing Sheets

(51) Int. Cl.
*B33Y 30/00* (2015.01)
*B29K 105/00* (2006.01)

(56) References Cited

U.S. PATENT DOCUMENTS

| | | | |
|---|---|---|---|
| 2004/0031780 A1* | 2/2004 | Hagemeister | A61C 13/0004 219/121.85 |
| 2004/0187714 A1 | 9/2004 | Napadensky | |
| 2009/0039570 A1* | 2/2009 | Clark | B22F 3/1055 264/653 |
| 2009/0202378 A1* | 8/2009 | Illston | B22F 3/1055 419/1 |

* cited by examiner

HYBRID SUPPORT SYSTEMS AND METHODS OF GENERATING A HYBRID SUPPORT SYSTEM USING THREE DIMENSIONAL PRINTING

CROSS-REFERENCE TO RELATED APPLICATIONS

This application is a continuation under 35 U.S.C. § 120 of International Application No. PCT/EP2014/058484, filed on Apr. 25, 2014 (and published by the International Bureau as International Publication No. WO2014/174090 on Oct. 30, 2014), which claims priority to U.S. Provisional Application No. 61/816,313, filed Apr. 26, 2013. The entire contents of the above-referenced patent applications are hereby incorporated by reference.

BACKGROUND OF THE INVENTION

Field of the Invention

The present application relates generally to additive manufacturing and/or three dimensional printing techniques. In particular, this application relates to hybrid support systems and methods for generating a hybrid support system using additive manufacturing techniques and/or three dimensional printing.

Description of the Related Technology

Additive manufacturing and/or three dimensional printing techniques allow for fabrication of three dimensional objects directly from computer generated files. These additive manufacturing techniques provide the ability to quickly manufacture both simple and complex objects without tooling.

In some additive manufacturing techniques, high amounts of stresses and/or strains may occur during the build or generation of the three dimensional object. For example, thermal and/or mechanical stresses and/or strains may occur due to a high temperature of an energy source used in generating the three dimensional object. As another example, internal mechanical stresses and/or strains of the object may be caused by properties of the particular material being used, such as shrinking or expansion as the material is treated. In one specific example, high stresses and/or strains typically occur in the processing of metal and metal powders in the absence of a pre-heating system. Techniques for processing metal and metal powders include, for example, direct metal laser sintering (EOS GmbH), laser curing (Concept Laser GmbH), selective laser melting (SLM Solutions GmbH) or sintering. High stresses and/or strains on the object may cause certain portions of the object to deform during the build, which may result in the build crashing or a defective object. Accordingly, it may be desirable to support the three dimensional object using a support to keep the object in place and/or to prevent deformations of the object during the build process.

Various problems exist in the use of supports to keep the object in place and/or to prevent deformation. For example, it may be expensive to create a support that is large enough to sufficiently support the three dimensional object due to the cost of the materials needed to generate the support. Further, removal of a support from the object during post-processing after the object has been built is costly, may leave residue on the object, and/or may damage the object.

In light of these and other deficiencies recognized by the inventors, there is a need for hybrid support systems and methods of generating the same to provide strong support for three dimensional objects at a low cost without damaging the object.

SUMMARY

The devices, systems, and methods of the present disclosure have several features, no single one of which is solely responsible for the desirable attributes described herein. Without limiting the scope of this application as expressed by the claims which follow, some prominent features will now be described herein. After considering this discussion, and particularly after reading the section entitled "Detailed Description of Certain Inventive Embodiments," one will understand how the features of this invention provide several advantages over traditional additive manufacturing and/or three dimensional printing systems and methods.

One aspect of the subject matter described in the disclosure provides a hybrid support system for supporting an object formed by three dimensional printing. The hybrid support system comprises one or more volume support structures, a first volume support structure of the one or more volume support structures being coupled to a base plate and to a first portion of the object. The hybrid support system further comprises a partially solidified support structure coupled to a second portion of the object. The hybrid support system further comprises one or more reinforcement support structures, a first reinforcement support structure of the one or more reinforcement support structures being coupled to the base plate and to at least one of a portion of the partially solidified support structure and a third portion of the object.

Another aspect of the subject matter described in the disclosure provides a method of generating a hybrid support system for supporting an object formed by three dimensional printing. The method comprises depositing a plurality of layers of solidifiable material. The method further comprises applying energy to each of the plurality of layers of solidifiable material for at least partially solidifying each of the plurality of layers to generate the object and to generate one or more volume support structures from a base plate to one or more respective portions of the object, a partially solidified support structure coupled to a first portion of the object, and one or more reinforcement support structures from the base plate to at least one of respective portions of the partially solidified support structure and respective portions of the object.

Another aspect of the subject matter described in the disclosure provides a method of forming an object and a hybrid support system. The method comprises depositing a first amount of solidifiable material on a base plate and forming a first cross-section of the object by applying energy to a first portion of the first amount of solidifiable material. The method further comprises forming a first cross-section of a volume support structure by applying an additional amount of energy to a second portion of the first amount of solidifiable material, forming a first cross-section of a partially solidified support structure by applying a reduced amount of energy to a third portion of the first amount of solidifiable material, and forming a first cross-section of a reinforcement support structure by applying the additional amount of energy to a fourth portion of the first amount of solidifiable material. The method further comprises depositing a second amount of solidifiable material over at least the first cross-section of the object and forming a second cross-section of the object by applying energy to a first portion of the second amount of solidifiable material.

Another aspect of the subject matter described in the disclosure provides a three dimensional printing device. The three dimensional printing device comprises a vessel configured to hold a solidifiable material, an energy source disposed over the vessel, and a controller coupled to the energy source. The controller is configured to control the energy source so that the energy source delivers energy to each of a plurality of layers of the solidifiable material for at least partially solidifying each of the plurality of layers to generate the object and to generate one or more volume support structures from a base plate to one or more respective portions of the object, a partially solidified support structure coupled to a second portion of the object, and one or more reinforcement support structures from the base plate to at least one of respective portions of the partially solidified support structure and respective portions of the object.

BRIEF DESCRIPTION OF THE DRAWINGS

These and other features, aspects, and advantages of the invention disclosed herein are described below with reference to the drawings of preferred embodiments, which are intended to illustrate and not to limit the invention. Additionally, from figure to figure, the same reference numerals have been used to designate the same components of an illustrated embodiment. The following is a brief description of each of the drawings.

DETAILED DESCRIPTION OF CERTAIN INVENTIVE EMBODIMENTS

Figure 1:
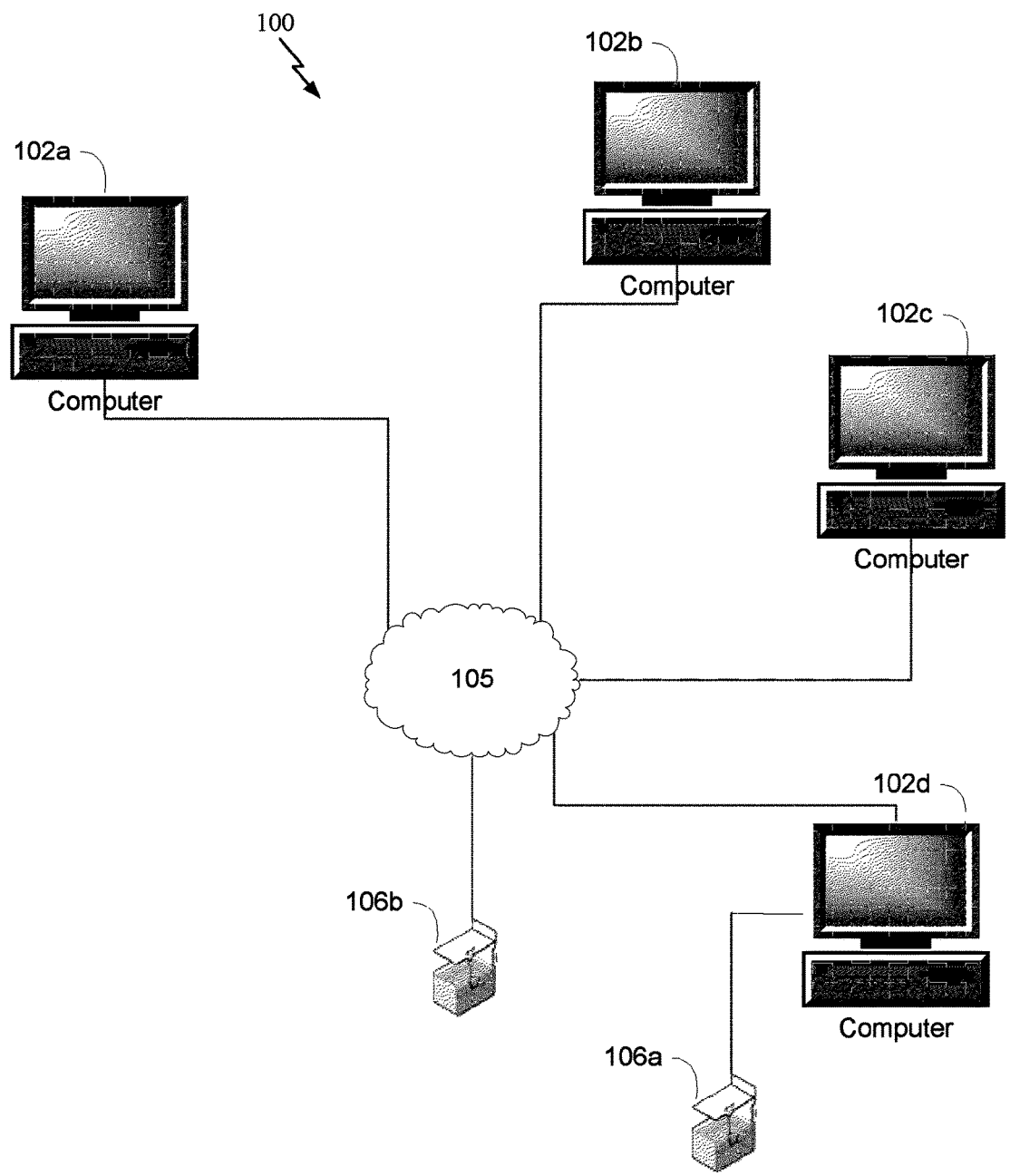
FIG. 1 is one example of a system for designing and manufacturing three dimensional (3-D) objects.

The following description and the accompanying figures are directed to certain specific embodiments. The embodiments described in any particular context are not intended to limit this disclosure to the specified embodiment or to any particular usage. Those of skill in the art will recognize that the disclosed embodiments, aspects, and/or features are not limited to any particular embodiments. The devices, systems, and methods described herein may be designed and optimized for use in a variety fields.

The present invention will be described with respect to particular embodiments but the invention is not limited thereto but only by the claims.

As used herein, the singular forms "a", "an", and "the" include both singular and plural referents unless the context clearly dictates otherwise.

The terms "comprising," "comprises" and "comprised of" as used herein are synonymous with "including," "includes" or "containing," "contains," and are inclusive or open-ended and do not exclude additional, non-recited members, elements or method steps. The terms "comprising," "comprises," and "comprised of" when referring to recite components, elements or method steps also include embodiments which "consist of said recited components, elements or method steps.

Furthermore, the terms first, second, third and the like in the description and in the claims, are used for distinguishing between two or more elements and not necessarily for describing a quantity or a sequential or chronological order, unless specified. It is to be understood that the terms so used are interchangeable under appropriate circumstances and that the embodiments of the invention described herein are capable of operation in other sequences than described or illustrated herein. Thus, a reference to first and second elements, for example, does not necessarily mean that only two elements may be employed or that the first element must precede the second element in some manner. Also, unless stated otherwise, a set of elements may comprise one or more elements. Reference throughout this specification to "one embodiment," "an embodiment," "some aspects," "an aspect," or "one aspect" means that a particular feature, structure or characteristic described in connection with the embodiment or aspect is included in at least one embodiment of the present invention. Thus, appearances of the phrases "in one embodiment," "in an embodiment," "some aspects," "an aspect," or "one aspect" in various places throughout this specification are not necessarily all referring to the same embodiment or aspects, but may. Furthermore, the particular features, structures or characteristics may be combined in any suitable manner, as would be apparent to a person skilled in the art from this disclosure, in one or more embodiments or aspects. Furthermore, while some embodiments or aspects described herein include some but not other features included in other embodiments or aspects, combinations of features of different embodiments or aspects are meant to be within the scope of the invention, and form different embodiments or aspects, as would be understood by those in the art. For example, in the appended claims, any of the features of the claimed embodiments or aspects can be used in any combination.

One of skill in the art will recognize that the techniques and methods described herein may be performed using various additive manufacturing and/or three dimensional (3-D) printing systems. Similarly, the products formed by the techniques and methods described herein may be formed using various additive manufacturing and/or 3-D printing systems and materials. Typically, additive manufacturing or 3-D printing techniques start from a digital representation of the 3-D object to be formed. Generally, the digital representation is divided into a series of cross-sectional layers, which are overlaid to form the object as a whole. The layers represent the 3-D object, and may be generated using additive manufacturing modeling software executed by a computing device. For example, the software may include computer aided design and manufacturing (CAD/CAM)

software. Information about the cross-sectional layers of the 3-D object may be stored as cross-sectional data. An additive manufacturing or 3-D printing machine or system utilizes the cross-sectional data for the purpose of building the 3-D object on a layer by layer basis. Accordingly, additive manufacturing or 3-D printing allows for fabrication of 3-D objects directly from computer generated data of the objects, such as computer aided design (CAD) files. Additive manufacturing or 3-D printing provides the ability to quickly manufacture both simple and complex parts without tooling and without the need for assembly of different parts.

Examples of additive manufacturing and/or three dimensional printing techniques include stereolithography, selective laser sintering, fused deposition modeling (FDM), foil-based techniques, and the like. Stereolithography ("SLA"), for example, utilizes a vat of liquid photopolymer "resin" to build an object a layer at a time. Each layer includes a cross-section of the object to be formed. First, a layer of resin is deposited over the entire building area. For example, a first layer of resin may be deposited on a base plate of an additive manufacturing system. An electromagnetic ray then traces a specific pattern on the surface of the liquid resin. The electromagnetic ray may be delivered as one or more laser beams which are computer-controlled. Exposure of the resin to the electromagnetic ray cures, or, solidifies the pattern traced by the electromagnetic ray, and causes it to adhere to the layer below. After a coat of resin has been had been polymerized, the platform descends by a single layer thickness and a subsequent layer of liquid resin is deposited. A pattern is traced on each layer of resin, and the newly traced layer is adhered to the previous layer. A complete 3-D object may be formed by repeating this process. The solidified 3-D object may be removed from the SLA system and processed further in post-processing.

Selective laser sintering ("SLS") is another additive manufacturing technique that uses a high power laser, or another focused energy source, to fuse small fusible particles of solidifiable material. In some embodiments, selective laser sintering may also be referred to as selective laser melting. In some embodiments, the high power laser may be a carbon dioxide laser for use in the processing of, for example, polymers. In some embodiments, the high power laser may be a fiber laser for use in the processing of, for example, metallic materials. Those of skill in the art will recognize that, in some embodiments, other types of high power lasers may be used depending on the particular application. The particles may be fused by sintering or welding the particles together using the high power laser. The small fusible particles of solidifiable material may be made of plastic powders, polymer powders, metal (direct metal laser sintering) powders, or ceramic powders (e.g., glass powders, and the like). The fusion of these particles yields an object that has a desired 3-D shape. For example, a first layer of powdered material may be deposited on a base plate. A laser may be used to selectively fuse the first layer of powdered material by scanning the powdered material to create and shape a first cross-sectional layer of the 3-D object. After each layer is scanned and each cross-sectional layer of the object is shaped, the powder bed may be lowered by one layer of thickness, a new layer of powdered material may be applied on top of the previous layer, and the process may be repeated until the build is completed and the object is generated. The cross-sectional layers of the 3-D object may be generated from a digital 3-D description of the desired object. The 3-D description may be provided by a CAD file or from scan data input into a computing device. The solidified 3-D object may be removed from the SLS system and processed further in post-processing.

Additive manufacturing or 3-D printing systems include, but are not limited to, various implementations of SLA and SLS technology. Materials used may include, but are not limited to, polyurethane, polyamide, polyamide with additives such as glass or metal particles, resorbable materials such as polymer-ceramic composites, etc. Examples of commercially available materials include: DSM Somos® series of materials 7100, 8100, 9100, 9420, 10100, 11 100, 12110, 14120 and 15100 from DSM Somos; Accura Plastic, DuraForm, CastForm, Laserform and VisiJet line of materials from 3-Systems; Aluminium, CobaltChrome and Stainless Steel materials; Maranging Steel; Nickel Alloy; Titanium; the PA line of materials, PrimeCast and PrimePart materials and Alumide and CarbonMide from EOS GmbH.

Objects formed using the additive manufacturing techniques described above have a tendency to distort from the designed dimensions of the object. For example, high amounts of stresses and/or strains may occur on the 3-D object during the build or generation of the 3-D object using the additive manufacturing techniques. For example, thermal and/or mechanical stresses and/or strains may occur during a SLS process due to a high temperature of an energy source used in generating the 3-D object. As an example, high temperature gradients may be present due to the melting of the powders used in the SLS process, such as metal alloy powders, and these high gradients may cause thermal stresses and/or strains on the object. Furthermore, internal mechanical stresses and/or strains may be caused within the object due to properties of the particular material being used. These mechanical stresses and/or strains may include, for example, shrinking or expansion of the material used to form the object as the material is scanned by the energy source. High stresses and/or strains on the object may cause certain portions of the object to deform during the build, which may result a crash of the build or an inaccurate and/or defective object. For example, a powder coater in a SLS machine may hit a deformed portion of the object and/or the dimensional accuracy of the object may be negatively affected.

Various supports may be used to keep the object in place and/or to prevent deformations of the object during the build process. However, problems may arise in the use of these supports. For example, creating a support that is large enough to sufficiently support the three dimensional object may be expensive due to the cost of the materials needed to generate the support. Further, removal of a support from the 3-D object during post-processing after the object has been built is costly, may leave residue on the object, and/or may damage the object.

In view of the above deficiencies, the inventors have recognized a need for hybrid support systems and methods of generating the hybrid support systems to provide strong support for 3-D objects at a low cost without damaging the object. In order to achieve these goals, a hybrid support system may be designed and manufactured with enough mechanical strength to prevent deformation of the object during the build, while also providing heat dissipation for certain portions of the object. The hybrid support system may further be designed and manufactured with a minimum amount of support structures so that the volume of solidifiable material that needs to be treated by the energy source is minimized. The use of fewer support structures also minimizes damage to the object and/or the amount of residue that is left on the object, and also reduces the cost of removing the supports during post-processing of the object.

The hybrid support system may also be designed and manufactured to be easily removable from the 3-D object after the build to further minimize damage and/or residue and also to limit the amount of post-processing that is required for the object, leading to fewer costs.

In some embodiments, the hybrid support system for supporting an object formed by additive manufacturing or 3-D printing may include one or more volume support structures, a partially solidified support structure, and one or more reinforcement support structures. A first volume support structure of the one or more volume support structures may be coupled to a base plate and to a first portion of the object. The partially solidified support structure may be coupled to a second portion of the object. A first reinforcement support structure of the one or more reinforcement support structures may be coupled to the base plate and to either a portion of the partially solidified support structure or a third portion of the object. A more detailed example of a hybrid support system will be described below.

Various aspects will now be described with reference to specific forms or embodiments selected for the purpose of illustration. It will be appreciated that the spirit and scope of the objects disclosed herein is not limited to the selected embodiments. Moreover, it is to be noted that the figures provided herein are not drawn to any particular proportion or scale, and that many variations may be made to the illustrated embodiments. Brief introductions to some of the features, which may be common to embodiments disclosed herein, are now described.

FIG. 1 depicts one example of a system 100 for designing and manufacturing 3-D objects and/or products. The system 100 may be configured to support the techniques described herein. For example, the system 100 may be configured to design and generate a 3-D object and a corresponding hybrid support system, such as any one or more of those described in further detail below. In some embodiments, the system 100 may include one or more computers 102a-102d. The computers 102a-102d may take various forms such as, for example, any workstation, server, or other computing device capable of processing information. The computers 102a-102d may be connected by a computer network 105. The computer network 105 may be the Internet, a local area network, a wide area network, or some other type of network. The computers may communicate over the computer network 105 via any suitable communications technology or protocol. The computers 102a-102d may share data by transmitting and receiving information such as software, digital representations of 3-D objections, commands and/or instructions to operate an additive manufacturing device, and the like.

The system 100 further may include one or more additive manufacturing devices 106a and 106b. These additive manufacturing devices may take the form of 3-D printers or some other manufacturing device as known in the art. In the example shown in FIG. 1, the additive manufacturing device 106a is connected to the computer 102a. The additive manufacturing device 106a is also connected to computers 102a-102c via the network 105 which connects computers 102a-102d. Additive manufacturing device 106b is also connected to the computers 102a-102d via the network 105. A skilled artisan will readily appreciate that an additive manufacturing device such as devices 106a and 106b may be directly connected to a computer 102, connected to a computer 102 via a network 105, and/or connected to a computer 102 via another computer 102 and the network 105.

Although a specific computer and network configuration is described in FIG. 1, a skilled artisan will also appreciate that the additive manufacturing techniques described herein may be implemented using a single computer configuration which controls and/or assists the additive manufacturing device 106, without the need for a computer network.

Figure 2:
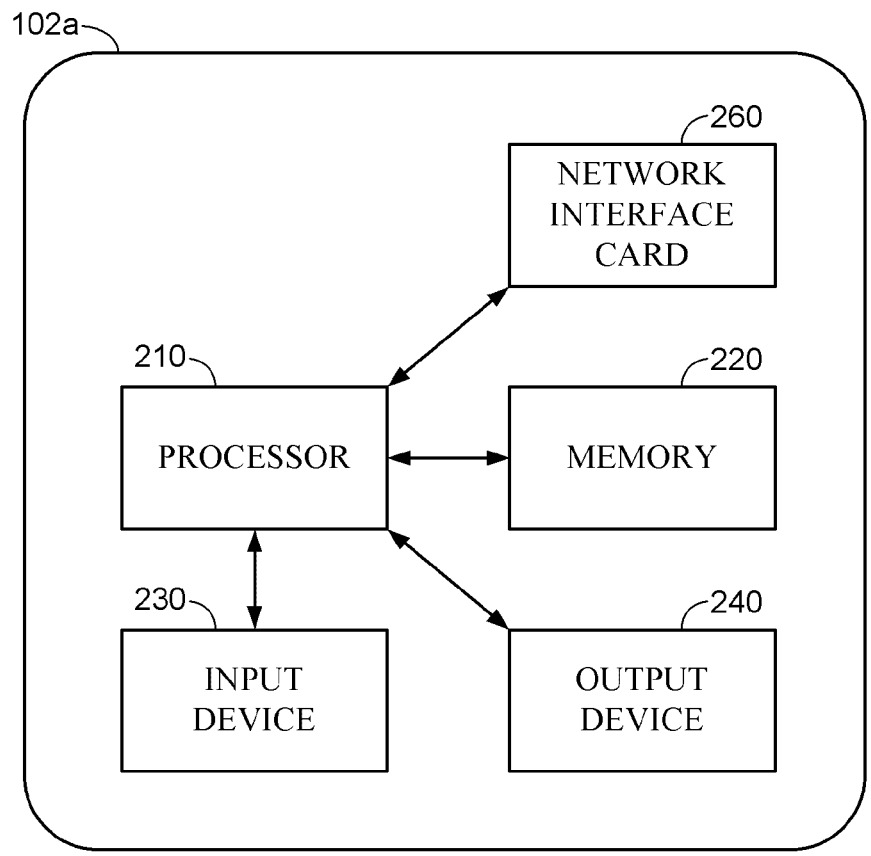
FIG. 2 is a functional block diagram of one example of a computer of FIG. 1.

Turning to FIG. 2, a more detailed view of computer 102a shown in FIG. 1 is provided. The computer 102a includes a processor 210. The processor 210 is in data communication with various computer components. These components may include a memory 220, an input device 230, and an output device 240. In certain embodiments, the processor may also communicate with a network interface card 260. Although described separately, it is to be appreciated that functional blocks described with respect to the computer 102a need not be separate structural elements. For example, the processor 210 and network interface card 260 may be embodied in a single chip or board.

The processor 210 may be a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 may be coupled, via one or more buses, to read information from or write information to memory 220. The processor may additionally, or in the alternative, contain memory, such as processor registers. The memory 220 may include processor cache, including a multi-level hierarchical cache in which different levels have different capacities and access speeds. The memory 220 may further include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 may also be coupled to an input device 230 and an output device 240 for, respectively, receiving input from and providing output to a user of the computer 102a. Suitable input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to a computer. The input device may also take the form of a touch screen associated with the display, in which case a user responds to prompts on the display by touching the screen. The user may enter textual information through the input device such as the keyboard or the touch-screen. Suitable output devices include, but are not limited to, visual output devices, including displays and printers, audio output devices, including speakers, headphones, earphones, and alarms, additive manufacturing devices, and haptic output devices.

The processor 210 further may be coupled to a network interface card 260. The network interface card 260 prepares data generated by the processor 210 for transmission via a network according to one or more data transmission protocols. The network interface card 260 may also be configured to decode data received via the network. In some embodiments, the network interface card 260 may include a transmitter, receiver, or both. Depending on the specific embodiment, the transmitter and receiver can be a single integrated component, or they may be two separate components. The network interface card 260, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
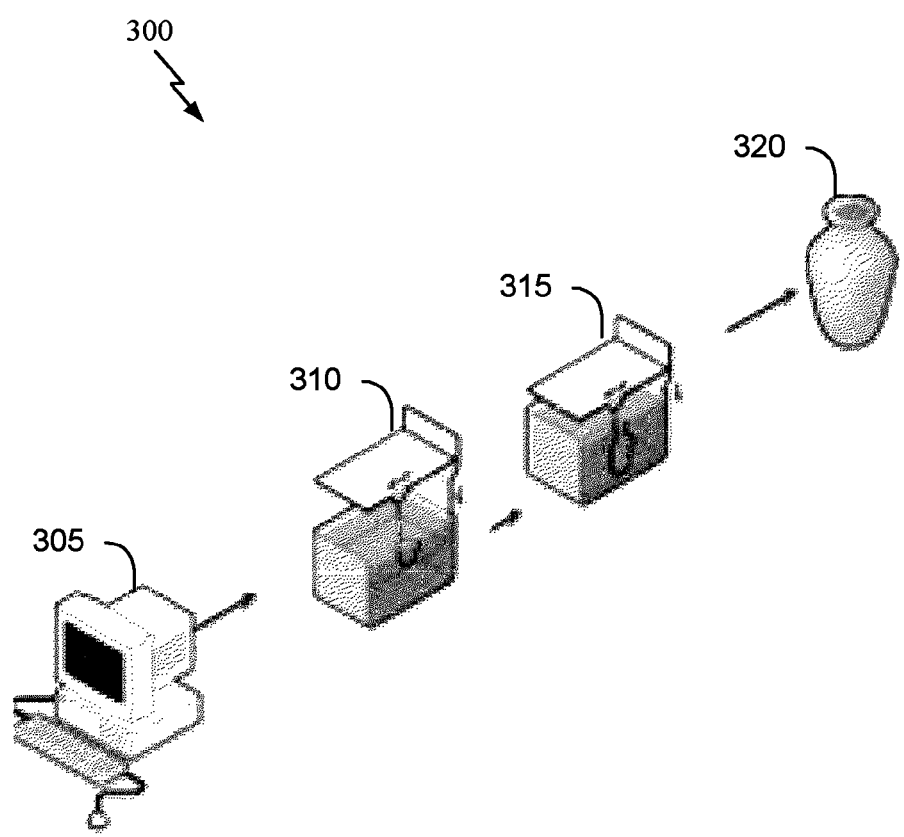
FIG. 3 is one example of a process for manufacturing a 3-D object.

Using the devices described in connection with FIGS. 1 and 2 above, an additive manufacturing process may be employed to produce a 3-D object or device. FIG. 3 is an illustration of one such process. In particular, FIG. 3 shows a general process 300 for manufacturing a 3-D object and a corresponding hybrid support system, such as those that will be described in further detail below in connection with FIGS. 9-10.

The process begins at step 305, where a digital representation of the 3-D object to be manufactured is designed using a computer, such as the computer 102a. In some embodiments, a 2-D representation of the object may be used to create a 3-D model of the object. Alternatively, 3-D data may be input to the computer 102a for aiding in designing the digital representation of the 3-D object. The process continues to step 310, where information is sent from the computer 102a to an additive manufacturing device, such as additive manufacturing device 106. Next, at step 315, the additive manufacturing device 106 begins manufacturing the 3-D object by performing an additive manufacturing process using suitable materials. Suitable materials include, but are not limited to polypropylene, thermoplastic polyurethane, polyurethane, acrylonitrile butadiene styrene (ABS), polycarbonate (PC), PC-ABS, polyamide, polyamide with additives such as glass or metal particles, methyl methacrylate-acrylonitrile-butadiene-styrene copolymer, resorbable materials such as polymer-ceramic composites, and other similar suitable materials. In some embodiments, commercially available materials may be utilized. These materials may include: DSM Somos® series of materials 7100, 8100, 9100, 9420, 10100, 11 100, 12110, 14120 and 15100 from DSM Somos; ABSplus-P430, ABSi, ABS-ESDI, ABS-M30, ABS-M30i, PC-ABS, PC-ISO, PC, ULTEM 9085, PPSF and PPSU materials from Stratasys; Accura Plastic, DuraForm, CastForm, Laserform and VisiJet line of materials from 3-Systems; Aluminium, CobaltChrome and Stainless Steel materials; Maranging Steel; Nickel Alloy; Titanium; the PA line of materials, PrimeCast and PrimePart materials and Alumide and CarbonMide from EOS GmbH. Using the appropriate materials, the additive manufacturing device then completes the process at step 320, where the 3-D object is generated.

Figure 4:
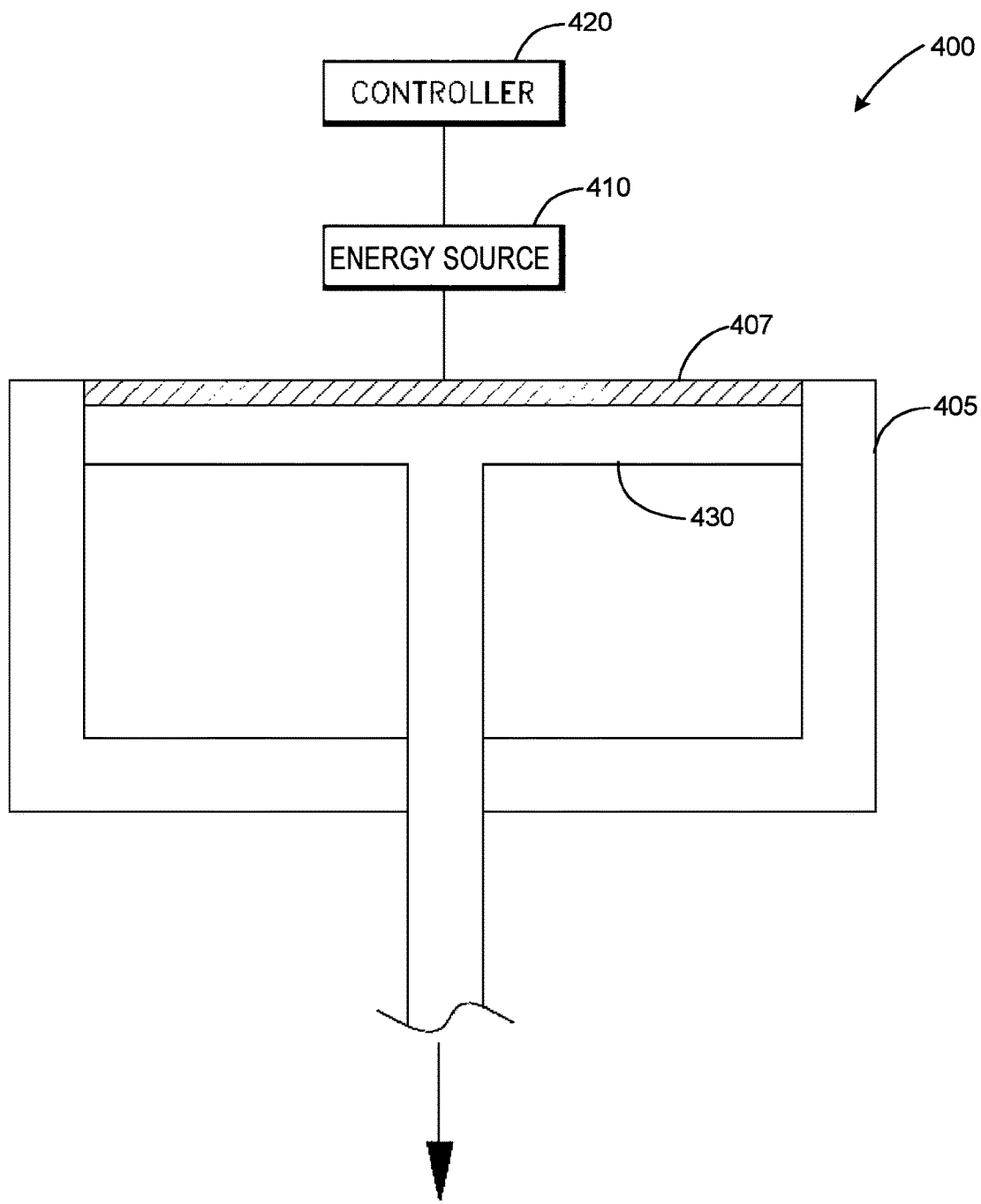
FIG. 4 is a schematic illustration of one example of a 3-D printing machine that may be used to perform the techniques disclosed herein.

Using a process such as process 300 described in connection with FIG. 3 or the processes 900 and 1000 described below in connection with FIGS. 9 and 10, respectively, a 3-D object and a corresponding hybrid support system may be manufactured using a 3-D printing machine that implements one or more additive manufacturing techniques. FIG. 4 shows a schematic illustration of one example of a 3-D printing machine 400 that may be used to perform the processes and/or techniques disclosed herein. In some embodiments, the 3-D printing machine 400 corresponds to one of the additive manufacturing devices 106a or 106b illustrated in FIG. 1. The 3-D printing machine 400 may be configured to perform selective laser sintering to generate a 3-D object. The 3-D printing machine 400 may include a vessel 405 of solidifiable material, such as a powder material 407. The powder material 407 includes a plurality of powder particles that are at least partially fused together when struck by an energy source 410, such as one or more computer controlled laser beams. The particles may be made of plastic powders, polymer powders, metal powders (direct metal laser sintering), ceramic powders, glass powders, or the like. The energy source 410 may be a programmable energy source that may be configured to apply different amounts of energy at different speeds and at different hatching distances to the powder material 407. For example, the energy source 410 may be a high power laser, such as a carbon dioxide laser. A controller 420 may control the energy source 410. In some embodiments, the controller 420 corresponds to the one of the computers 102a-102d illustrated in FIG. 1 and/or the processor 210 illustrated in FIG. 2. Those of skill in the art will recognize that, in some embodiments, the 3-D printing machine 400 may also be configured to perform stereolithography or other additive manufacturing technique to generate a 3-D object and that the vessel 405 may include any other type of solidifiable material, such as a liquid resin.

In some embodiments, a digital representation of the 3-D object to be formed is input to the 3-D printing machine 400. Using the digital representation of the 3-D object, a digital representation of a hybrid support system for the particular 3-D object may be automatically generated by the controller 420 and/or other hardware and/or software. The digital representations of the 3-D object and the corresponding hybrid support system is divided into a series of cross-sectional layers which can be overlaid to form the object and the hybrid support system. Data representing the cross-sectional layers may be stored in one or more computer files. The controller 405 may use this data for building the object and hybrid support system on a layer by layer basis. The cross-sectional layer data of the 3-D object and the hybrid support system may be generated using a computer system and computer aided design and manufacturing (CAD/CAM) software. The data files for the 3-D object and the hybrid support system may be programmed or input into the 3-D printing machine 400. A first layer of the powder material 407 may be deposited on a base plate 430. Based on the input data files, the 3-D printing machine 400 may direct the computer controlled energy source 410 onto the surface of the first layer of the powder material 407 to generate a first cross-sectional layer of the 3-D object and a first cross-sectional layer of each support structure of the hybrid support system. For example, a high power laser may be used to selectively fuse several of the particles of the layer together by sintering or welding the particles to create the first cross-sectional shape of the 3-D object and the first cross-sectional layer of each support structure of the hybrid support system. The base plate 430 and the object may then be lowered to a depth corresponding to a desired thickness of the next cross-sectional layer of the object. A roller or other transport mechanism may cause a next layer of powder material 407 to be deposited from a reservoir (not shown) into the vessel 405 over the preceding object cross-sectional layer. The controller 420 may then apply the energy source 410 to the next layer of powder material 407 to generate the next cross-sectional layer of the 3-D object and the next cross-sectional layer of each support structure of the hybrid support system. This process may be repeated until the build is complete and the object and hybrid support system are generated.

Figure 5:
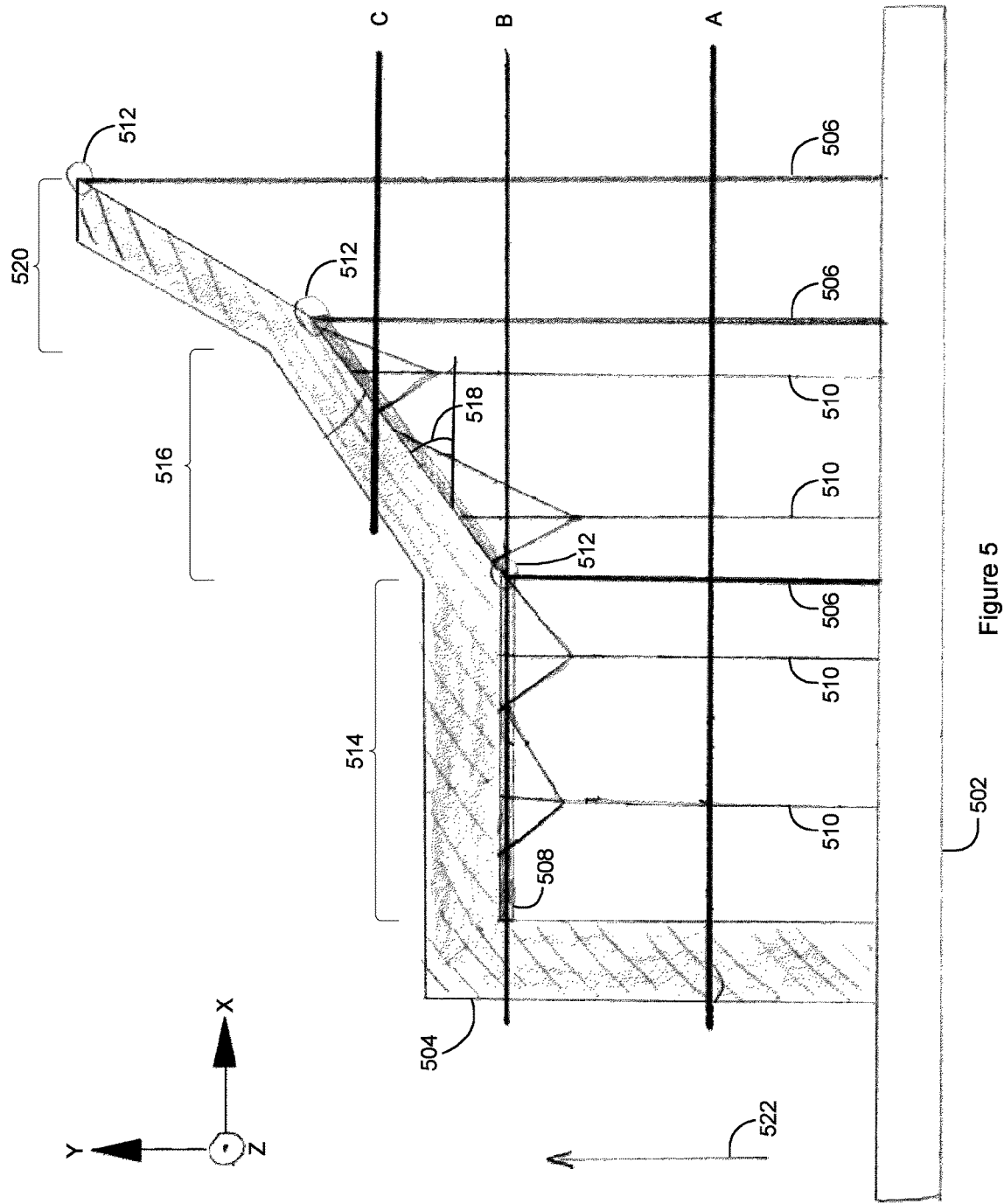
FIG. 5 is a side plan view illustrating a 3-D object and a hybrid support system.
Figure 6:
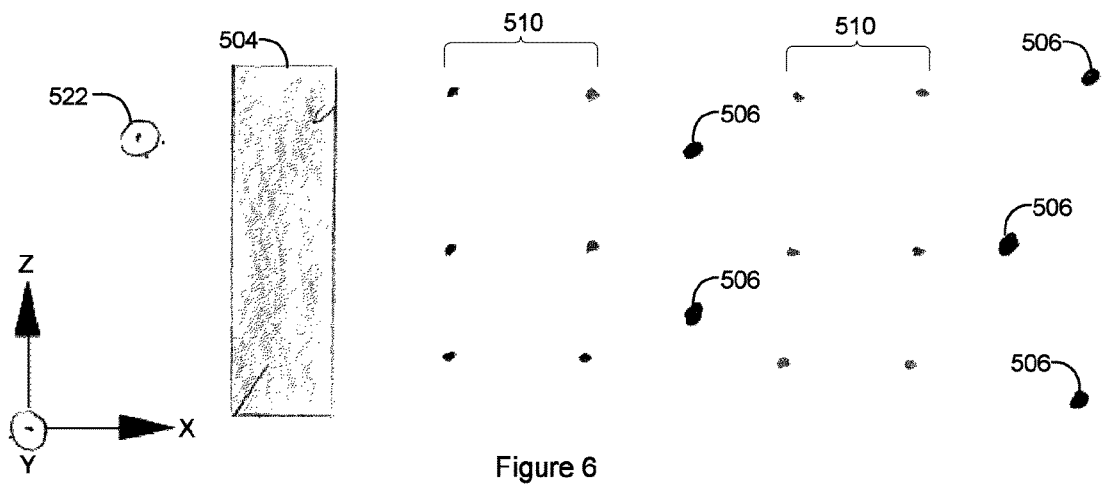
FIG. 6 is a top plan view illustrating a first exemplary cross-section of the 3-D object and hybrid support system of FIG. 5.
Figure 7A:
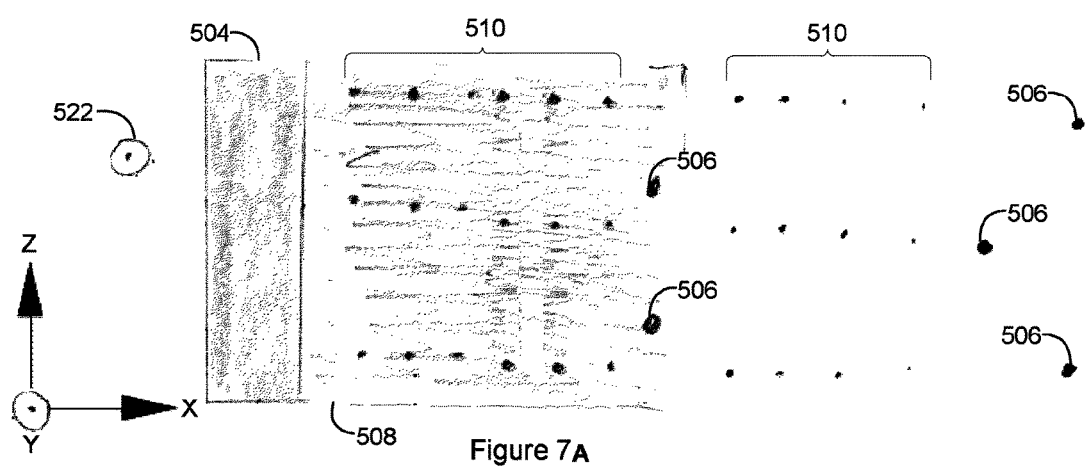
FIGS. 7A and 7B are top plan views illustrating a second and third exemplary cross-sections of the 3-D object and hybrid support system of FIG. 5.
Figure 7B:
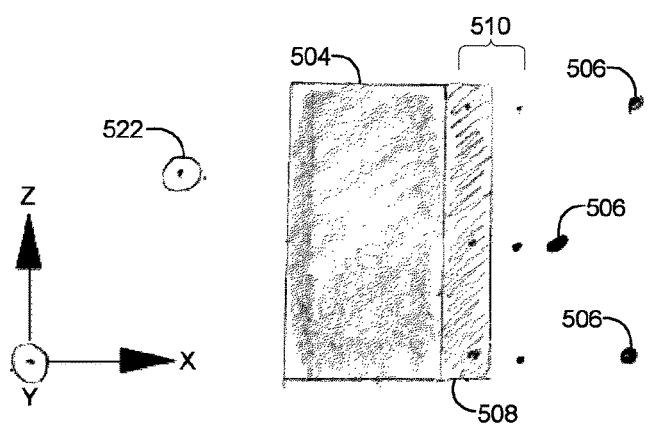
Figure 8:
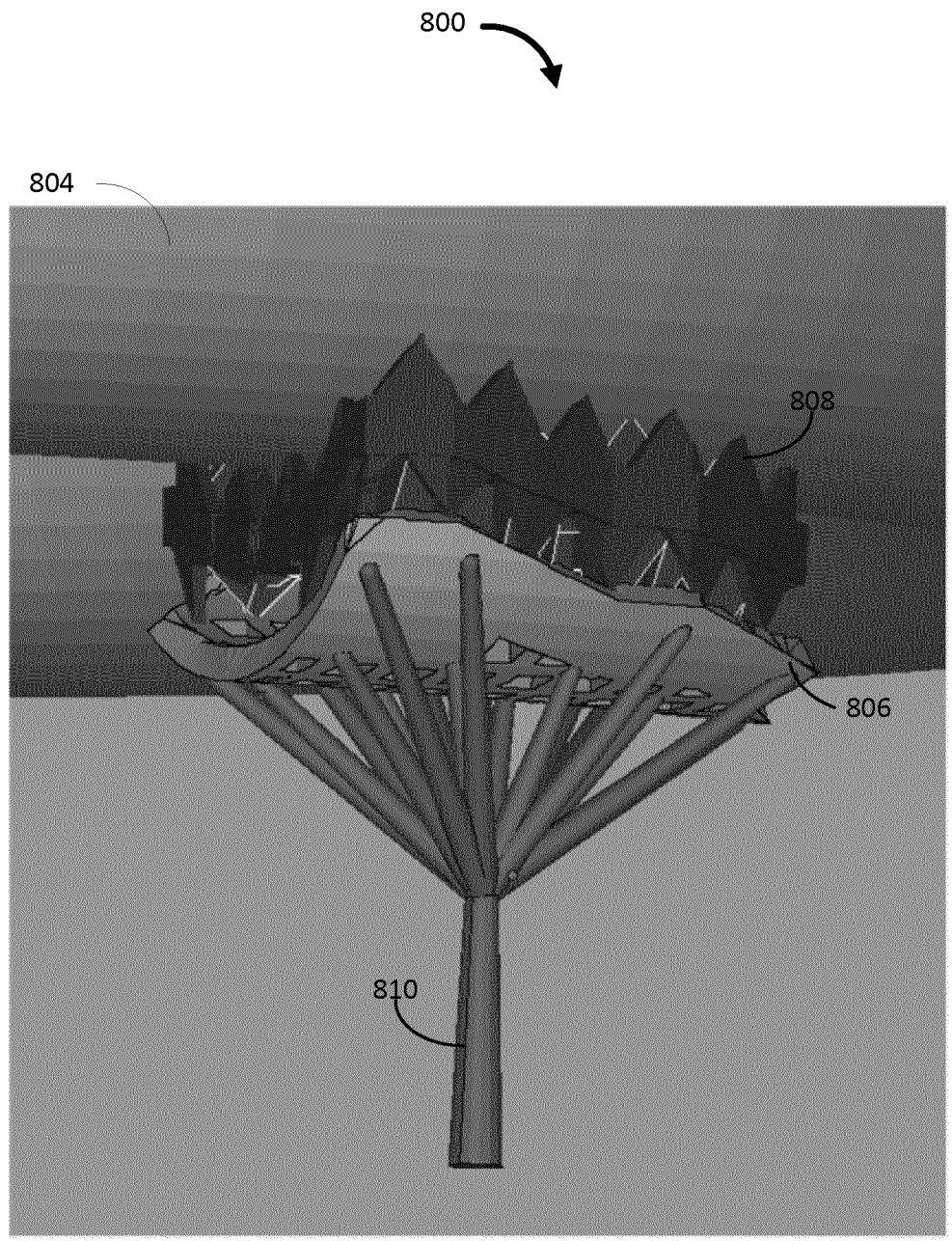
FIG. 8 is a top plan view illustrating a third exemplary cross-section of the 3-D object and hybrid support system of FIG. 5.

Turning to FIG. 5, a side plan view illustrating a three dimensional (3-D) object 504 and a hybrid support system is shown. The hybrid support system includes volume support structures 506, reinforcement support structures 510, and partially solidified support structure 508. As described with respect to FIG. 4, data files for the 3-D object 504 and the hybrid support system may be programmed or input into the 3-D printing machine 400 and used to generate the 3-D object 504 and the hybrid support system. The 3-D object 504 is generated using the data files for the 3-D object. Using the data files for the hybrid support system, the volume support structures 506, the partially solidified support structure 508, and the reinforcement support structures 510 are generated as the 3-D object 504 is formed. The 3-D object 504, the volume support structures 506, and the reinforcement support structures 510 are built from the base plate 502 upward in the build direction 522. The build direction 522 is in the direction of the y-axis. As described in detail further below, the hybrid support system may be generated based on the particular support needs of the 3-D object 504. FIGS. 6-7B show different top plan views illustrating exemplary cross-sections of the 3-D object 504 and hybrid support system of FIG. 5. The build direction 522 in each of FIGS. 6-8 is in the direction of the y-axis. FIG. 6 shows a top plan view of the cross-section A illustrated in FIG. 5. The cross-section A shown in FIG. 6 includes the object 504, the reinforcement support structures 510, and the volume support structures 506. FIG. 7 shows a top plan view of the cross-section B illustrated in FIG. 5. The cross-section B shown in FIG. 7A includes the object 504, the partially solidified support structure 508, the reinforcement support structures 510, and the volume support structures 506. FIG. 7B shows a top plan view of the cross-section C illustrated in FIG. 5. The cross-section C shown in FIG. 7B includes the object 504, the partially solidified support structure 508, the reinforcement support structures 510, and the volume support structures 506.

Each of the volume support structures 506, the reinforcement support structures 510, and the partially solidified support structure 508 include distinct features that provide support and/or heat dissipation for the 3-D object 504. The volume support structures 506 are generally thicker and stronger compared to the reinforcement support structures 510 and the partially solidified support structure 508. The thick and strong nature of the volume support structures 506 may be generated to prevent the portions 512 of the object 504 for which the volume support structures 506 are attached from deforming, which further prevents the entire object from deforming. The volume support structures 506 prevent deformation by exerting a force in the opposite direction as that of the stress or strain that causes the deformation, thus counteracting the deformation. In some embodiments, the portions 512 are selected so that the entire object can be supported and to prevent deformation of the entire object using as few volume support structures 506 as possible.

The volume support structures 506 may include a block support structure, a line support structure, and/or a point support structure. For example, a block support structure may be used to support a large block portion of the 3-D object 504. A line support structure may be used to support a specific line portion of the object 504. A point support structure may be used to support an individual point on the object 504. Those of skill in the art will recognize that the volume support structures 506 may include any shape and/or size needed to meet the support requirements of the various portions of the particular object 504. For example, if a particular portion of an object that needs support using a volume support structure 506 is in a spiral shape, the volume support structure 506 may be built in a corresponding spiral shape to provide the necessary support for that portion of the object 504.

The mechanical properties of the resulting solidified material, and thus the 3-D object 504 and hybrid support system, may be altered and customized by applying a set of processing parameters to the layers of solidifiable material. Different processing parameters may be applied depending on whether it is the 3-D object or a particular type of support structure that is being formed. The processing parameters may include, for example, an amount of applied energy, the speed at which the energy is applied, a change in hatching distance, the specific scanning pattern (the pattern that is followed by the energy source in order to build a support structure in a particular layer of solidifiable material), an energy source intensity profile, and the like.

For example, the thick and strong mechanical property of the volume support structures 506 may be achieved by using a set of processing parameters that cause the controller 420 to apply an additional amount of energy to the solidifiable material that corresponds to the volume support structures 506 as compared to the amount of energy used to generate the 3-D object 504. Applying additional energy to select portions of the solidifiable material may allow for selective stiffness. In some embodiments, the processing parameters for forming the volume support structures 506 may further include a decrease in hatching distance compared to that used to form the 3-D object 504. The hatching distance is the distance between consecutive lines followed by energy source beams (e.g., laser beam). For example, an energy source may perform several horizontal or vertical scans (in a horizontal slice) with an energy source beam when scanning a layer of solidifiable material. If the hatching distance is decreased, the distance between each consecutive line followed by an energy source beam is decreased, resulting in more energy being applied to the solidifiable material and thus more of the solidifiable material becoming cured and solidified. Thus, by decreasing the hatching distance while scanning the portions of solidifiable material corresponding to the volume support structures 506, more energy will be applied to the solidifiable material and more of the solidifiable material may be cured and solidified by the energy source due to the decreased distance between scanning beams. Accordingly, applying the additional amount of energy and/or decreasing the hatching distance when forming the volume support structures 506 may result in a structure that is typically more stiff and strong than the reinforcement support structures 510 and the partially solidified support structure 508. At a particular point of decreasing hatching distance, consecutive passes of the energy source beam will overlap, and there will no longer be an increase in material being solidified. Accordingly, there becomes a hatching distance that provides maximum stiffness.

As noted above, the hybrid support system is generated based on the particular support needs of the particular 3-D object 504 being generated. For example, the hybrid support system may be generated for the particular object 504 based on different properties of the object 504 and/or the build process. These properties may include the shape of the object 504, the thickness of the object 504, the material used to generate the object 504, the temperature of the energy source that is to be used during the build, other thermomechanical properties of the object, and the like. Properties of the object 504 and/or the build process may further include the properties of the device on which the object is produced. For example, when pre-heating of the powder bed is used, the stresses and/or strains on the object 504 are lower and, as a result, less thick support structures may be used.

As noted above, in some embodiments, the portions 512 for which the volume support structures 506 are attached may be selected so that the entire object can be supported and to prevent deformation of the entire object using as few volume support structures 506 as possible. In some embodiments, the portions 512 of the object for which the volume support structures 506 are coupled may be determined based on one or more of the properties of the object 504 and/or the build process described above. In some embodiments, the portions 512 may be determined based on a thermo-mechanical property of the portions 512. For example, to determine the portions of the 3-D object 504 that need a volume support structure 506, the magnitude of a thermal stress force at every point in the 3-D object 504 may be estimated and the portions of the object 504 that would experience the highest deformation are determined. In some embodiments, if a deformation is likely to occur for a particular portion of the object 504 that exceeds a threshold level, it may be determined that a volume support structure 506 is needed at that portion to counteract the thermal stress forces. In some embodiment, the thermal stress forces may be determined on a layer by layer basis. For example, the thermal stress forces may be determined at each point of a first cross-sectional layer of the 3-D object 504. Next, the thermal stress forces may be determined at each point of a second cross-sectional layer of the 3-D object 504. This process may be performed for each cross-sectional layer of the 3-D object 504 to determine the thermal stress force at every point in the 3-D object. The controller 420 and/or other hardware and/or software may cause the 3-D printing machine 400 to generate a volume support structure 506 for all points of the object 504 that are likely to experience deformation that exceeds the deformation threshold level.

The partially solidified support structure 508 is designed to have less stiffness than the volume support structures 506 and the reinforcement support structures 510. As explained above, the mechanical properties of the resulting 3-D object 504 may be altered and customized by applying different sets of processing parameters to the layers of solidifiable material depending on whether it is the 3-D object or a particular type of support structure that is being formed. For example, the partially solidified support structure 508 may be formed by using a set of processing parameters that cause the controller 420 to apply a reduced amount of energy (as compared to the amount of energy used to generate the 3-D object 504) to the portions of the solidifiable material layers that correspond to the partially solidified support structure 508. The energy applied to the solidifiable material may be represented as $E_{density}=P/(V*H)$, where $E_{density}$ is the energy density applied to the material, P is the power of the energy source beam (e.g., laser beam), V is the speed of the energy source beam, and H is the hatching distance. Accordingly, the partially solidified support structure 508 may be formed by lowering the power of the beam, increasing the speed of the beam, and/or increasing the hatching distance. As one example, if a selective laser sintering ("SLS") technique is used, using less laser power in combination with a high energy application or scanning speed and/or increased hatching distance causes the solidifiable powder material to be sintered instead of melted, causing the partially solidified support structure 508 to have a partially solidified mechanical property. For example, by sintering the particles of powder material to fuse the particles together, some portion of each particle is melted and some portion of each particle is not melted, thus creating the partially solidified mechanical property. The hatching distance may be increased as compared to the hatching distance used to form the 3-D object 504. As explained above, the hatching distance is the distance between consecutive lines followed by energy source beams. If the hatching distance is increased, the distance between each consecutive line followed by the energy source beam is increased. By increasing the hatching distance while scanning the portions of solidifiable material corresponding to the partially solidified support structure 508, less energy will be applied to the solidifiable material and thus less of the solidifiable material will be cured and solidified by the energy source due to the increased distance between scanning beams. Scanning the solidifiable material using processing parameters including an increased hatching distance helps to create a partially solidified mechanical property and assists in creation of the partially solidified support structure 508.

In some embodiments, the partially solidified support structure 508 is in the shape of a rectangle or square for coupling to the 3-D object 504. In other embodiments, the partially solidified support structure 508 may be designed to have different shapes that are used to maximize heat dissipation from the 3-D object 504. For example, the partially solidified support structure 508 may be in the shape of a fin, a spiral, a web, and the like. These shapes may assist the partially solidified support structure 508 in transferring heat from the 3-D object 504 to the partially solidified support structure 508.

As illustrated in FIG. 5, the portion of the object 504 for which the partially solidified support structure 508 is coupled includes a subset of the plurality of cross-sectional layers of the 3-D object 504. Thus, the partially solidified support structure 508 is not built from the base plate 502 up to the object 504, and is instead generated using only a portion of the layers of solidifiable material. As one example, the partially solidified support structure 508 may include a subset of layers of solidifiable material, such as 1 layer, 2 layers, 3 layers, 4 layers, or any other number of layers needed to provide the appropriate heat dissipation for the 3-D object. Accordingly, the partially solidified support structure 508 may have a corresponding thickness, such as 10 µm, 20 µm, 30 µm, 40 µm, 50 µm, 60 µm, 70 µm, 80 µm, 90 µm, 100 µm, 1 cm, 2 cm, 3 cm, 4 cm, 5 cm, and the like.

The partially solidified mechanical property of the partially solidified support structure 508 allows the partially solidified support structure 508 to act as a heat sink for dissipating heat from the energy source away from the portion of the object 504 for which the partially solidified support structure 508 is attached. For example, the partially solidified support structure 508 may operate to transfer heat from the object to the partially solidified support structure 508. Accordingly, the partially solidified support structure 508 may be formed near portions of the 3-D object 504 that require heat dissipation. The partially solidified support structure 508 is coupled to portions 514 and 516, which correspond to overhang zones of the object 504. As described in further detail below, the overhang zones are portions of the object 504 for which the angle alpha between the tangent plane of the object surface and the horizontal plane is less than or equal to a certain critical angle. The critical angle may be chosen to be 45°, but may vary according to the specific application. In some embodiments, the overhang zones may be surrounded by more powder than solid material during the build. The powder material does not conduct heat very well, and thus heat from the energy source may be piled up during application of the energy source at the overhang zones. Accordingly, the partially solidified support structure 508 may be used to enhance the heat flow while the portions 514 and 516 of the 3-D object 504 are built.

In some embodiments, more than one partially solidified support structure 508 may be generated during the build of the 3-D object 504. For example, a separate partially solidified support structure 508 may be generated for each overhang zone of a particular object. In some embodiments, if an object includes multiple overhang zones that are adjacent to one another, a single continuous partially solidified support structure 508 may be generated to be coupled to the overhang zones.

The reinforcement support structures 510 are designed to be thinner and have less stiffness than the volume support structures 506, but with more stiffness than the partially solidified support structure 508. The reinforcement support structures 510 are built from the base plate 502 towards the overhang zones, such as portions 514 and 516 of the 3-D object 504. The reinforcement support structures 510 may be coupled to respective portions of the partially solidified support structure 508 and/or to respective portions of the 3-D object. For example, the reinforcement support structures 510 may pass through the partially solidified support structure 508 to couple to the 3-D object 504. As another example, the reinforcement support structures 510 may be directly coupled to the object 504. As yet another example, the reinforcement support structures 510 may be coupled only directly to the partially solidified support structure 508. The reinforcement support structures 510 may be used to provide reinforcement to the partially solidified support structure 508 and/or the object 504, and also to provide further heat dissipation for the 3-D object 504. For example, the reinforcement support structures 510 may transfer heat from the 3-D object to the reinforcement support structures 510. In some embodiments, the reinforcement support structures 510 may be coupled directly to the 3-D object 504 when being used to provide support for the object 504.

The reinforcement support structures 510 may be formed by using a set of processing parameters that cause the controller 420 to apply a same or a reduced amount of energy (as compared to the amount of energy used to generate the volume support structures 506) to the portions of the solidifiable material layers that correspond to the reinforcement support structures 510. The reduced thickness and corresponding stiffness of the reinforcement support structures 510 as compared to the volume support structures 506 may be achieved by applying the desired amount of energy to less of the solidifiable material in the x-direction than that used to generate the volume support structures 506. In some embodiments, the same amount of energy as that used to generate the volume support structures 506 may be applied to the solidifiable material to achieve the desired stiffness of the reinforcement support structures 510. In other embodiments, a less amount of energy than that used to generate the volume support structures 506 may be applied to achieve the desired stiffness of the reinforcement support structures 510.

In some embodiments, the processing parameters for forming the reinforcement support structures 510 may further include a decrease in hatching distance compared to that used to form the 3-D object 504. In some embodiments, the hatching distance for the reinforcement support structures 510 is decreased less than the hatching distance used to form the volume support structures 506. Accordingly, in some embodiments, the hatching distance used to form the volume support structure 506 may be smaller than the hatching distance used to form the reinforcement support structures 510, which may be smaller than the hatching distance used to form the 3-D object 504, which may be smaller than the hatching distance used to form the partially solidified support structure 508. As explained above, if the hatching distance is decreased, the distance between each energy source beam is decreased, resulting in more energy being applied to the solidifiable material and thus more of the solidifiable material becoming cured and solidified by the beam. Thus, by decreasing the hatching distance while scanning the portions of solidifiable material corresponding to the reinforcement support structures 510, more of the solidifiable material may be cured and solidified by the energy source due to the decreased distance between scanning beams. Accordingly, applying the additional amount of energy and/or decreasing the hatching distance when forming the reinforcement support structures 510 results in a structure that is stiffer and stronger than the partially solidified support structure 508. As explained above, consecutive passes of the energy source beam will overlap at a particular point of decreasing hatching distance, and there will no longer be an increase in material being solidified. As a result, a hatching distance may be reached that provides maximum stiffness.

The overhang zones in a particular 3-D object that require enhanced heat dissipation may be determined by calculating at every point of the object surface the angle alpha between the tangent plane of the surface at that point and the horizontal plane (x-z plane). The overhang zones can then be defined as the sum of all points where the angle alpha is smaller than or equal to a critical angle. Accordingly, it is determined that a particular zone in a layer generally only requires support using a reinforcement support structure 510 and/or heat dissipation if the angle alpha of the zone is less than or equal to the critical angle. The critical angle may be set as the angle at which a point on the object will be surrounded during the build process by more powder than solid material such that an excess amount of heat will pile up. The self-supporting capacity of a particular point or layer may also be taken into account in determining the critical angle. The critical angle may be set at 0°, 5°, 10°, 15°, 20°, 25°, 30°, 35°, 40°, 45°, 50°, 55°, or any angle up to 89°.

For example, in the embodiment illustrated in FIG. 5, the critical angle is set at 45°. The angle alpha at each point along the surface of the 3-D object 504 may be determined in order to decide if an overhang exists. For example, the angle 518 may be determined in order to decide if an overhang exists at that particular point of the 3-D object 504. Based on the angles at each point, the controller 420 and/or other hardware and/or software may be used to determine where along the 3-D object 504 to generate one or more reinforcement support structures 510 and one or more partially solidified support structures 508. For example, the angle alpha of portion 514 is 0° and is thus smaller than the critical angle of 45°. Furthermore, the angle alpha of portion 516 is 45° and is thus equal to the critical angle. Accordingly, the controller 420 and/or other hardware and/or software may determine that overhangs exists at portions 514 and 516, and may cause the 3-D printing machine 400 to generate during the build the reinforcement support structures 510 and the partially solidified support structure 508 in the layers of solidifiable material corresponding to portions 514 and 516 in order to provide heat dissipation and/or provide further support for the overhangs in addition to the volume supports 506.

The angle alpha of each point of the object 504 in portion 520 is above the critical angle. Accordingly, the controller 420 and/or other hardware and/or software determines that an overhang does not exist at portion 520, and thus no reinforcement support structures 510 or partially solidified support structure 508 is generated in the layers of solidifiable material corresponding to portion 520.

Those of skill in the art will recognize that the partially solidified support structure 508 and/or the reinforcement support structures 510 may be generated so that they are coupled to any portion of the object 504 if desired. In some embodiments, a user of the 3-D printing machine 400 may manually select among the different support structures to be used in the build process. For example, the 3-D printing machine 400 may include a user interface (e.g., input device 230 and/or output device 240) that can receive input from a user for controlling the 3-D printing machine 400.

By using a combination of the volume support structures 506, the partially solidified support structure 508, and the reinforcement support structures 510, the hybrid support system provides enough mechanical strength to prevent deformation of the 3-D object 504 during the build and also provides heat dissipation for portions 514 and 516 of the object, which further prevents deformation of the 3-D object 504 in those portions. The hybrid support system also uses only the necessary amount of support structures to provide the required support and heat dissipation, which minimizes the volume of solidifiable material that needs to be treated by the energy source and also minimizes damage to the object 504 and/or the amount of residue that is left behind on the object 504 as the support structures 506, 508, and 510 are removed in post-processing. The hybrid support system is also easily removable from the 3-D object after the build during post-processing because only a minimum amount of support structures is used, which further minimizes damage and/or residue on the object and also limits the amount of post-processing that is required for the object. Post-processing is limited because less work is required to remove the support structures and treat the surface of the object 504 for blemishes and other defects left behind when the support structures are removed.

Turning now to FIG. 8, an example of another combination of support structures is provided. In this example, the hybrid support system includes a volume support structure 808 which supports the object 804 using teeth-like structures. The teeth-like structures support the object at various points to minimize the contact with the object, and also minimize the amount of material used to create the support structure. The volume support structure 808 may rest on an offset structure 806. The offset structure 806 may support the teeth-like structures on the bottom portion of the volume support structure 808. The offset structure 806 may include one or more apertures to reduce its volume, while at the same time providing mechanical strength sufficient to support the partially-solidified structure 808. In some embodiments, the volume support structure 808 may be further supported by a reinforcement support structure such as the tree support 810. Use of the tree support 810 also allows for the use of less powder and easy removal after the object is completed. In some embodiments, the tree support 810 may extend downward to a base plate. Alternatively, the tree support 810 may be supported by another type of support. In some embodiments, the offset structure may not be necessary, and instead, the volume support structure 808 may directly contact the tree support 810. In still other embodiments, the support structure 808 may be a reinforcement support structure. In still other embodiments, the support structure 808 may be a combination of volume support structure and reinforcement support structure.

Figure 9:
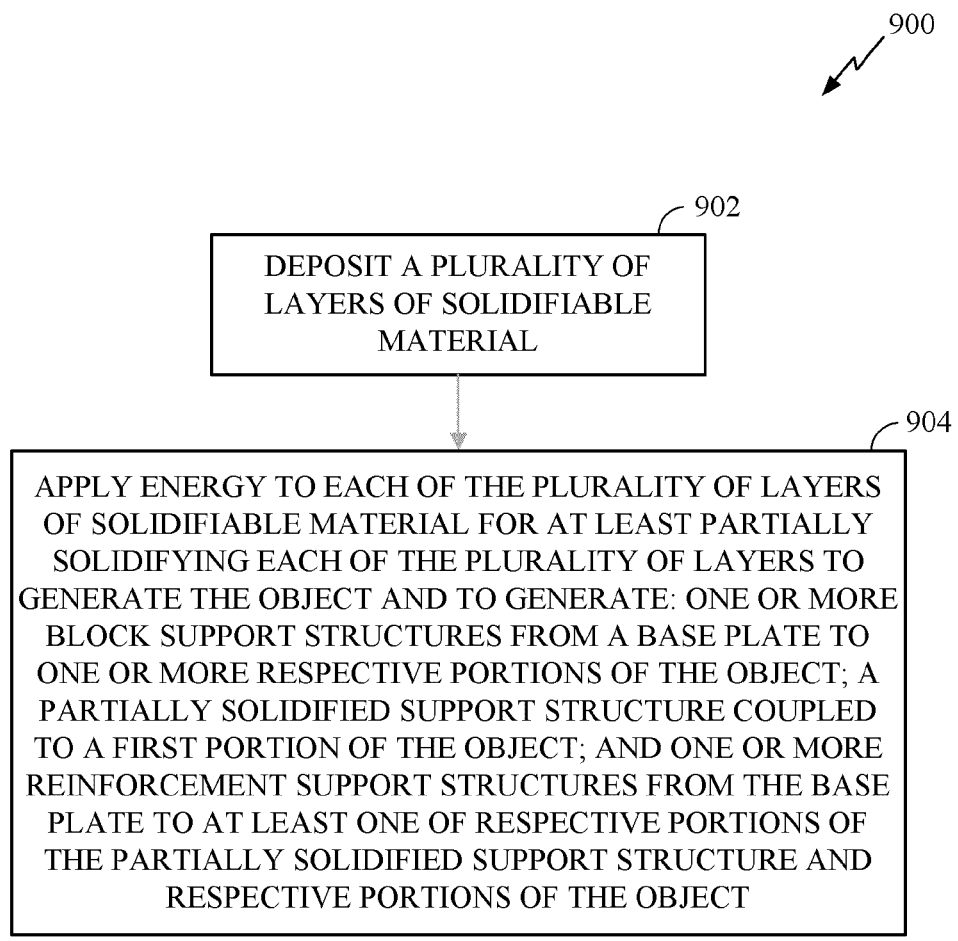
FIG. 9 is a flowchart of one example of a process for generating a hybrid support system for supporting an object formed by 3-D printing.
Figure 10:
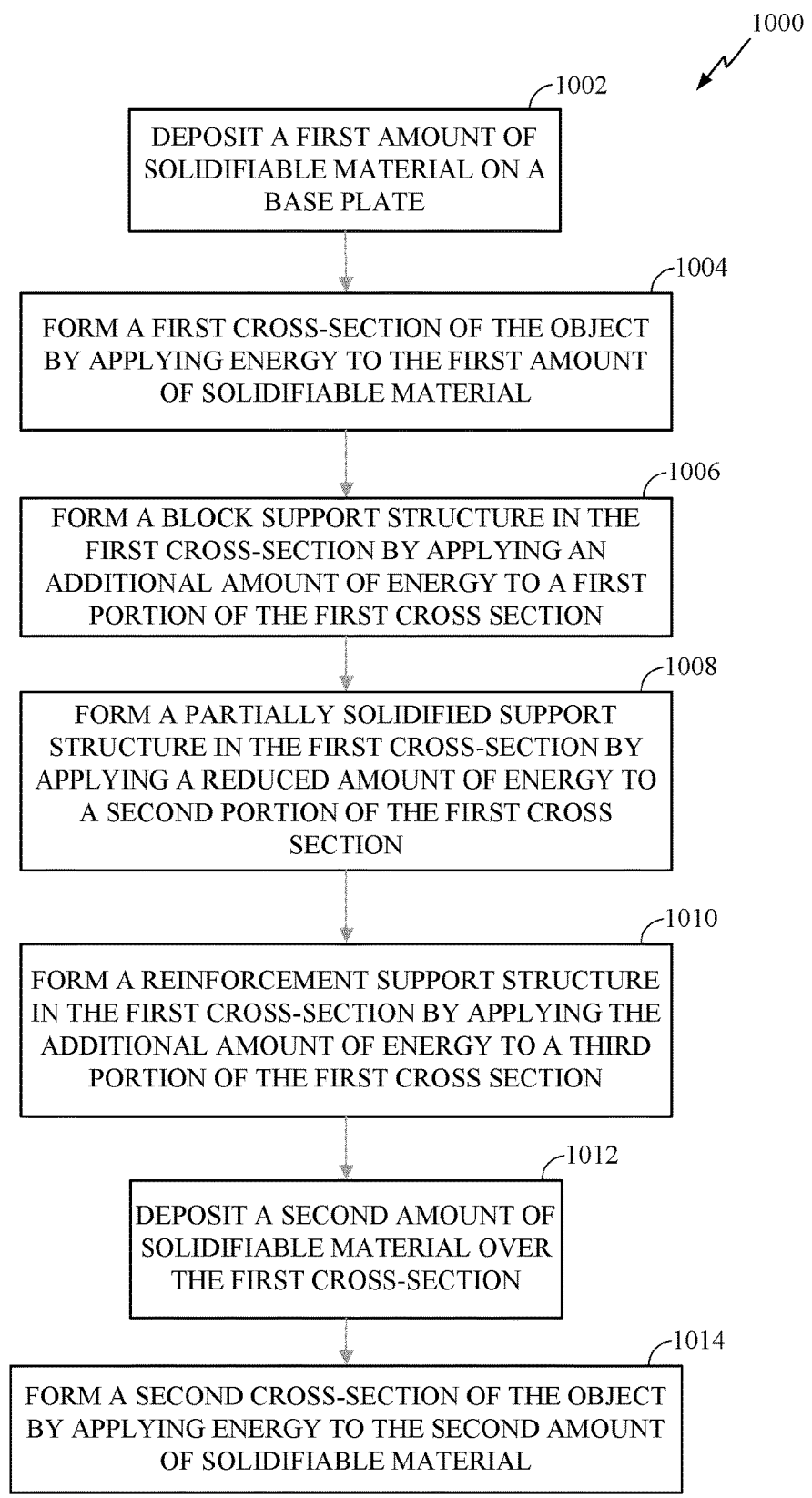
FIG. 10 is a flowchart of one example of a process for forming an object and a hybrid support system.

FIG. 9 illustrates one example of a process 900 for generating a hybrid support system for supporting an object formed by 3-D printing. Although the process 900 may be described below with respect to elements of the 3-D printing machine 400 illustrated in FIG. 4 and/or the 3-D object and hybrid support system illustrated in FIG. 5, those having ordinary skill in the art will appreciate that other components may be used to implement one or more of the blocks described herein. The process 900 begins at step 902 by depositing a plurality of layers of solidifiable material. Each layer of solidifiable material can be any suitable thickness and may comprise a powder material or a liquid polymer. For example, the controller 420 may be used to cause each of the plurality of layers of solidifiable material to be deposited on the base plate 430 and/or on a preceding layer of solidifiable material. The solidifiable material may solidify when exposed to an energy source. In some embodiments, the energy source includes the energy source 410. The energy source may include a high power laser such as, for example, a carbon dioxide laser.

The process continues at step 904 by applying energy to each of the plurality of layers of solidifiable material for at least partially solidifying each of the plurality of layers to generate the object and to generate one or more volume support structures from a base plate to one or more respective portions of the object, a partially solidified support structure coupled to a first portion of the object, and one or more reinforcement support structures from the base plate to at least one of respective portions of the partially solidified support structure and respective portions of the object. For example, the controller 420 may be used to cause the energy source 410 to apply a certain amount of energy to various portions of each of the layers of solidifiable material in order to shape each cross-section of the object and each cross section of the support structures. The energy source may be configured to supply varying intensities such that energy delivered by the energy source can be controlled, for example by controller 420. In general, the more energy that is supplied to the solidifiable material, the more solid and stiff the solidifiable material becomes.

In some embodiments, the process 900 further comprises determining a set of most likely points of deformation on the object, and selectively generating each of the one or more volume support structures, the partially solidified support structure, and the one or more reinforcement support structures to prevent deformation of the set of most likely points of deformation and to minimize the amount of solidifiable material used in the generation of the support structures. In some embodiments, the process 900 further comprises selectively generating each of the partially solidified support structure and the one or more reinforcement support structures to provide heat dissipation for the object. In some embodiments, the process 900 further comprises determining the one or more respective portions of the object based on a thermo-mechanical property of the one or more respective portions of the object, wherein the one or more volume support structures are configured to prevent the one or more respective portions of the object from deforming.

In some embodiments, generating the partially solidified support structure includes applying a set of processing parameters to a subset of the plurality of layers of solidifiable material. As explained above, the mechanical properties of the object may be altered and customized by applying the set of processing parameters to the layers of solidifiable material. Different processing parameters may be applied depending on whether it is the object or a particular type of support structure that is being formed. The processing parameters may include, for example, an amount of applied energy, the speed at which the energy is applied, a change in hatching distance, and the like.

In some embodiments, the process 900 further comprises generating the one or more reinforcement support structures to be coupled to at least one of the respective portions of the partially solidified support structure and the respective portions of the object so that the one or more reinforcement support structures provide reinforcement and heat dissipation for the object. For example, the one or more reinforcement support structures may pass through the partially solidified support structure to couple to the object. As another example, the one or more reinforcement support structures may be directly coupled to the object. As yet another example, the one or more reinforcement support structures may be coupled only to the partially solidified support structure. In some embodiments, at least one of the respective portions of the partially solidified support structure and the respective portions of the object for which the one or more reinforcement support structures are coupled are located at one or more overhang zones or portions of the object, as described above.

In some embodiments, the process 900 further comprises generating the one or more reinforcement support structures to be thinner than the one or more volume support structures.

In some embodiments, the solidifiable material comprises small fusible particles. For example, the small fusible particles may include plastic powders, polymer powders, metal powders, ceramic powders, and/or glass powders. FIG. 10 illustrates one example of a process 1000 for forming an object and a hybrid support system. Although the process 1000 may be described below with respect to elements of the 3-D printing machine 400 illustrated in FIG. 4 and/or the 3-D object and hybrid support system illustrated in FIG. 5, those having ordinary skill in the art will appreciate that other components may be used to implement one or more of the blocks described herein.

The process 1000 begins at step 1002 by depositing a first amount of solidifiable material on a base plate. The first layer of solidifiable material can be any suitable thickness and may comprise a powder material or a liquid polymer. For example, each layer of solidifiable material may have a thickness of 1 μm, 2 μm, 3 μm, 4 μm, 5 μm, 10 μm, 11 μm, 12 μm, 13 μm 14 μm, 15 μm, 100 μm, 150 μm, 200 μm, or any other suitable thickness. In some embodiments, the controller 420 may be used to cause the first layer of solidifiable material to be deposited on the base plate 430.

The process continues at step 1004 by forming a first cross-section of the object by applying energy to a first portion of the first amount of solidifiable material. For example, the object may be the object 504 illustrated in FIG. 5. The energy is applied using an energy source. The solidifiable material solidifies when exposed to the energy source, causing the first cross-section of the object to be formed. In some embodiments, the energy source includes the energy source 410. The energy source may include a high power laser such as, for example, a carbon dioxide laser. In some embodiments, the controller 420 may be used to cause the energy source 410 to apply a certain amount of energy the first portion of the first layer of solidifiable material in order to shape the first cross-section of the object. The energy source may be configured to supply varying intensities such that energy delivered by the energy source can be controlled, for example by controller 420. In general, the more energy that is supplied to the solidifiable material, the more solid and stiff the resulting solidified material becomes.

The process 1000 continues at step 1006 by forming a first cross-section of a volume support structure by applying an additional amount of energy to a second portion of the first amount of solidifiable material. For example, the volume support structure may be one of the volume support structures 506 illustrated in FIG. 5. In some embodiments, the volume support structure includes a thick and strong mechanical property and may be used to prevent the portions of the object for which the volume support structure is attached from deforming. In some embodiments, the volume support structure may be formed with the thick and strong mechanical property by using a first set of processing parameters that include an additional amount of energy as compared to the amount of energy used to generate the object. For example, the first set of processing parameters may cause the controller 420 to apply an additional amount of energy (as compared to the amount of energy used to generate the object) to the second portion of the first amount of solidifiable material. Applying additional energy to select portions of the solidifiable material may allow for selective stiffness. As noted above, energy may be represented as $E_{density}=P/(V*H)$, where $E_{density}$ is the energy density applied to the material, P is the power of the energy source beam (e.g., laser beam), V is the speed of the energy source beam, and H is the hatching distance. In general, there may be a maximum amount of energy that can be applied to the solidifiable material. However, applying a maximum amount of energy to the solidifiable material may result in maximum shrinkage and/or deformation of the cross-sectional layer of the object and/or support structures from a designed and/or desired shape. Therefore, the additional amount of energy may be selected to increase the stiffness of the volume support while avoiding or minimizing the amount of shrinkage and/or deformation of the volume support. In some embodiments, the hatching distance may be shortened when applying the energy source to the second portion of the first amount of solidified material as compared to the hatching distance used to create the object in order to form the volume support structure to have a stiff and strong mechanical property.

At step 1008, the process 1000 continues by forming a first cross-section of a partially solidified support structure by applying a reduced amount of energy to a third portion of the first amount of solidifiable material. For example, the partially solidified support structure may be the partially solidified support structure 508 illustrated in FIG. 5. In some embodiments, the partially solidified support structure may be formed to have less stiffness than the volume support structure. In some embodiments, the partially solidified support structure may be formed by using a second set of processing parameters. The second set of processing parameters may include a reduced amount of energy ($E_{density}=P/(V*H)$) as compared to the amount of energy used to generate the object. For example, the second set of processing parameters may cause the controller 420 to apply a reduced amount of energy at an increased speed and/or hatching distance (as compared to the amount of energy, speed, and hatching distance used to generate the object) to the third portion of the first amount of solidifiable material. In some embodiments, a selective laser sintering ("SLS") technique may be used, and less laser power may be used in combination with a high energy scanning speed and/or an increased hatching distance to cause the solidifiable powder material to be sintered instead of melted. The hatching distance is the distance between consecutive energy source beams.

As explained above, by increasing the hatching distance while scanning the second portion of the first cross-section, less of the solidifiable material will be cured and solidified by the energy source due to the increased distance between scanning beams. Scanning the solidifiable material using these processing parameters causes the second portion of the first cross-section to have a partially solidified mechanical property, thus creating the partially solidified support structure 508. In some embodiments, the partially solidified mechanical property of the partially solidified support structure allows the partially solidified support structure to act as a heat sink for dissipating heat from the energy source away from the portion of the object for which the partially solidified support structure is coupled. For example, the partially solidified support structure may operate to transfer heat from the object to the partially solidified support structure.

The process 1000 continues at step 1010 by forming a first cross-section of a reinforcement support structure by applying the additional amount of energy to a fourth portion of the first amount of solidifiable material. For example, the reinforcement support structure may be one of the reinforcement support structures 510 illustrated in FIG. 5. In some embodiments, the reinforcement support structures 510 are designed to be thinner and have less stiffness than the volume support structure, but with more stiffness than the partially solidified support structure. The reinforcement support structures may be used to provide reinforcement to the partially solidified support structure and/or the object, and also to provide further heat dissipation for the object. In some embodiments, the reinforcement support structure may be formed by using a third set of processing parameters. The third set of processing parameters may include a same or a reduced amount of energy as compared to the amount of energy used to generate the volume support structure. For example, the third set of processing parameters may cause the controller 420 to apply the additional amount of energy (the same as that used to generate the volume support structure) to the fourth portion of the first amount of solidifiable material. As explained above, applying the additional energy to the fourth portion of the first amount of solidifiable material allows for selective stiffness. In some embodiments, the reduced thickness and corresponding stiffness of the reinforcement support structure as compared to the volume support structure may be achieved by applying the desired amount of energy to less of the solidifiable material in the x-direction (see FIGS. 5-8) than that used to generate the volume support structure. In some embodiments, the same amount of energy as that used to generate the volume support structure may be applied to the solidifiable material to achieve the desired stiffness of the reinforcement support structure. In other embodiments, a less amount of energy than that used to generate the volume support structure may be applied to achieve the desired stiffness of the reinforcement support structure. In some embodiments, the hatching distance may be shortened when applying the energy source to the fourth portion of the first amount of solidified material as compared to the hatching distance used to create the object. In some embodiments, the hatching distance may be increased when applying the energy source to the fourth portion of the first amount of solidifiable material as compared to the hatching distance used to create the volume support structure in order to create a support structure that is less stiff than the volume support structure.

The process 1000 continues at step 1012 by depositing a second amount of solidifiable material over at least the first cross-section of the object. The second layer of solidifiable material can be any suitable thickness and may comprise a powder material or a liquid polymer. For example, the controller 420 may be used to cause the second layer of solidifiable material to be deposited on top of the first layer of solidifiable material after the varying amounts of energy are applied to the first layer.

Figure 11:
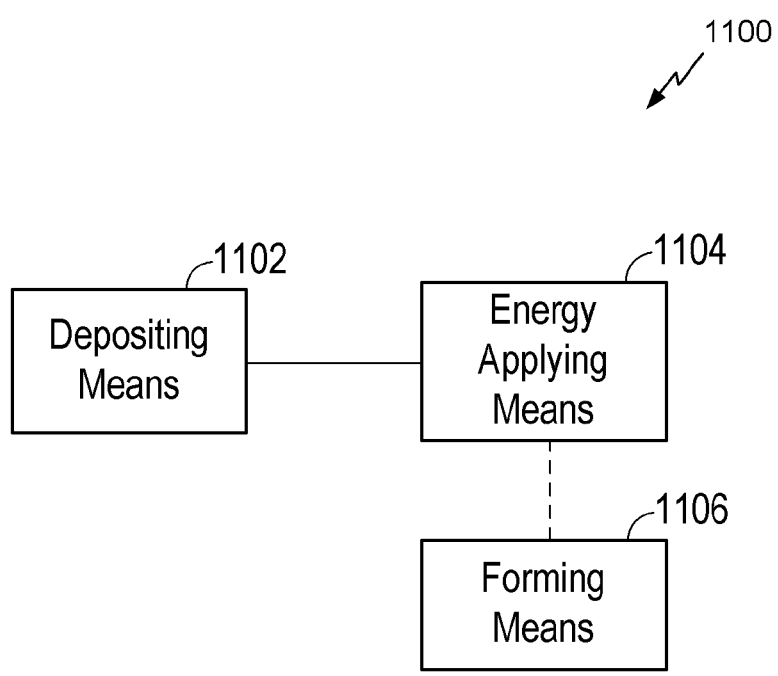
FIG. 11 illustrates an example of a functional block diagram of various components in a three dimensional printing device.

The process 1000 continues at step 1014 by forming a second cross-section of the object by applying energy to a first portion of the second amount of solidifiable material. The process 1000 continues until all cross-sectional layers of the object and hybrid support structure are formed according to one or more data files, as described above. FIG. 11 illustrates an example of a functional block diagram of various components in a three dimensional printing device 1100. Those skilled in the art will appreciate that the three dimensional printing device 1100 may have more components than the simplified three dimensional printing device 1100 shown in FIG. 11. The three dimensional printing device 1100 shown includes only those components useful for describing some prominent features of implementations within the scope of the claims.

The three dimensional printing device 1100 comprises a depositing means 1102. In some embodiments, the depositing means 1102 may deposit a plurality of layers of solidifiable material. For example, the depositing means 1102 may be configured to perform one or more of the functions discussed above with respect to block 902 illustrated in FIG. 9. In some embodiments, the depositing means 1102 may deposit a first amount of solidifiable material on a base plate and may further deposit a second amount of solidifiable material over at least a first cross-section of an object. For example, the depositing means 1102 may be configured to perform one or more of the functions discussed above with respect to blocks 1002 and 1012 illustrated in FIG. 10. The depositing means 1102 may correspond to one or more of the controller 420, a nozzle, a roller or other transport mechanism (not shown), and the like, as discussed above with respect to FIG. 4.

The three dimensional printing device 1100 further comprises an energy applying means 1104. The energy applying means 1104 may apply energy to each of the plurality of layers of solidifiable material for at least partially solidifying each of the plurality of layers to generate the object and to generate one or more volume support structures from a base plate to one or more respective portions of the object, a partially solidified support structure coupled to a first portion of the object, and one or more reinforcement support structures from the base plate to at least one of respective portions of the partially solidified support structure and respective portions of the object. For example, the energy applying means 1104 may be configured to perform one or more of the functions discussed above with respect to block 904 illustrated in FIG. 9. The energy applying means 1104 may correspond to one or more of the controller 420, the energy source 410, and the like, as discussed above with respect to FIG. 4. In some embodiments, the three dimensional printing device 1100 further comprises a forming means 1106. In some embodiments, the three dimensional printing device 1100 does not include a forming means 1106. In some embodiments, the three dimensional printing device 1100 comprises a forming means 1106 and does not include an energy applying means 1104. The forming means 1106 may form a first cross-section of the object by applying energy to a first portion of the first amount of solidifiable material, form a first cross-section of a volume support structure by applying an additional amount of energy to a second portion of the first amount of solidifiable material, form a first cross-section of a partially solidified support structure by applying a reduced amount of energy to a third portion of the first amount of solidifiable material, form a first cross-section of a reinforcement support structure by applying the additional amount of energy to a fourth portion of the first amount of solidifiable material, and form a second cross-section of the object by applying energy to a first portion of the second amount of solidifiable material. For example, the forming means 1106 may be configured to perform one or more of the functions discussed above with respect to blocks 1004-1010 and 1014 illustrated in FIG. 10. The forming means 1106 may correspond to one or more of the controller 420, the energy source 410, and the like, as discussed above with respect to FIG. 4.

It is to be noted that many variations may be made to the illustrated embodiments. Those of skill in the art will recognize that the disclosed aspects and features shown herein are not limited to any particular object formed by three dimensional printing techniques known in the art. Three dimensional printing techniques that include one or more of the features herein described may be designed for use with a variety of objects, tools, guides, devices that may be formed.

The various embodiments of the techniques described above in accordance with the present invention thus provide techniques for forming a three dimensional object along with a hybrid support system. Of course, it is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Those of skill would further appreciate that any of the various illustrative logical blocks, modules, cores, processors, controllers, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The invention disclosed herein may be implemented as a method, apparatus, or article of manufacture using standard programming or engineering techniques to produce software, firmware, hardware, or any combination thereof. Code or logic may be implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Furthermore, the skilled artisan will recognize the interchangeability of various features from different embodiments. In addition to the variations described herein, other known equivalents for each feature may be mixed and matched by one of ordinary skill in this art to construct objects in accordance with principles of the present invention. Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A hybrid support system for supporting an object formed from a metal powder material by three dimensional printing, comprising:
   one or more volume support structures formed from the metal powder material, a first volume support structure of the one or more volume support structures having a first strength and being coupled to both a base plate and to a first portion of the object, wherein the first volume support structure is configured to counteract thermal stress forces in the object;
   a partially solidified support structure formed from the metal powder material and coupled to a second portion of the object, the partially solidified support structure having a second strength less than the first strength, wherein the partially solidified support structure is configured to act as a heat sink for dissipating heat from an energy source away from the second portion of the object; and
   one or more reinforcement support structures, a first reinforcement support structure of the one or more reinforcement support structures formed from the metal powder material and coupled to the base plate and to the partially solidified support structure, the reinforcement structure configured to support the partially solidified support structure,
   wherein the first reinforcement support structure passes through a portion of the partially solidified support structure.

2. The hybrid support system of claim 1, wherein the one or more volume support structures, the partially solidified support structure, and the one or more reinforcement support structures are generated as the object is formed.

3. The hybrid support system of claim 1, wherein at least one of the one or more volume support structures is configured to prevent the object from deforming.

4. The hybrid support system of claim 1, wherein the first portion of the object for which the first volume support structure is coupled is determined based on a thermo-mechanical property of the first portion of the object.

5. The hybrid support system of claim 1, wherein the reinforcement structure is further configured to support a third portion of the object.

6. The hybrid support system of claim 5, wherein the object comprises a plurality of layers, and wherein the second portion of the object to which the partially solidified support structure is coupled includes a subset of the plurality of layers.

7. The hybrid support system of claim 1, wherein the first reinforcement support structure is coupled to at least one of the portion of the partially solidified support structure and a third portion of the object, and wherein said coupling is for providing reinforcement and heat dissipation for the object.

8. The hybrid support system of claim 7, wherein the at least one of the portion of the partially solidified support structure and the third portion of the object for which the first reinforcement support structure is coupled is located at an overhang portion of the object.

9. The hybrid support system of claim 1, wherein each of the one or more reinforcement support structures is thinner than each of the one or more volume support structures.

10. The hybrid support system of claim 1, wherein the first reinforcement support structure is a tree-shaped reinforcement support structure having a trunk portion and branches, and wherein the trunk portion is coupled to the base plate, and wherein the branches are coupled to the partially solidified support structure.

11. The hybrid support system of claim 10, wherein the first volume support structure further comprises a plurality of jagged structures extending upward toward the object and a plurality of jagged structures extending downward toward the tree-shaped reinforcement support structure, wherein the jagged structures extending upward are configured to contact the object, and wherein the jagged structures extending downward are configured to contact the tree-shaped reinforcement support structure, and wherein the hybrid support system further comprises an offset structure between the first volume support structure and the tree-shaped reinforcement support structure.

\* \* \* \* \*